United States Patent [19]

Clagett et al.

[11] Patent Number: 5,070,177

[45] Date of Patent: Dec. 3, 1991

[54] ULTRAVIOLET RADIATION RESISTANT POLYPHTHALATECARBONATE RESIN

[75] Inventors: Donald C. Clagett; Daniel W. Fox; Sheldon J. Shafer; Paul D. Sybert, all of Pittsfield, Mass.

[73] Assignee: General Electric Company, Pittsfield, Mass.

[21] Appl. No.: 372,240

[22] Filed: Jun. 26, 1989

Related U.S. Application Data

[63] Continuation of Ser. No. 266,980, Nov. 4, 1988, abandoned.

[51] Int. Cl.$^5$ ............................................. C08G 63/02
[52] U.S. Cl. ...................................... 528/196; 528/196
[58] Field of Search ................................ 528/176, 196

[56] References Cited

U.S. PATENT DOCUMENTS

| 3,028,365 | 4/1962 | Schnell et al. | 528/196 |
|---|---|---|---|
| 3,030,331 | 4/1962 | Goldberg | 528/182 |
| 3,169,121 | 2/1965 | Goldberg | 528/173 |
| 3,275,601 | 9/1966 | Schnell et al. | 528/199 |
| 3,334,154 | 8/1967 | Kim | 525/469 |
| 3,915,926 | 10/1975 | Wamback | 524/411 |
| 4,105,633 | 8/1978 | Swart et al. | 528/176 |
| 4,156,069 | 5/1979 | Prevorsek et al. | 528/182 |
| 4,188,314 | 2/1980 | Fox et al. | 524/494 |
| 4,194,038 | 3/1980 | Baker et al. | 528/182 |
| 4,238,596 | 12/1980 | Quinn | 528/179 |
| 4,238,597 | 12/1980 | Markezich et al. | 528/179 |
| 4,278,787 | 7/1881 | Swart et al. | 528/191 |
| 4,360,656 | 11/1982 | Swart et al. | 528/176 |
| 4,522,980 | 6/1985 | Miller | 525/67 |
| 4,535,104 | 8/1985 | Pyles | 524/91 |
| 4,605,726 | 8/1986 | Mark | 528/190 |
| 4,621,130 | 11/1986 | Rosenquist | 528/176 |
| 4,621,132 | 11/1986 | Quinn et al. | 528/194 |
| 4,628,081 | 12/1986 | Mark et al. | 528/196 |
| 4,696,995 | 9/1987 | Peters | 528/206 |
| 4,727,184 | 2/1988 | Rosenquist | 562/422 |

OTHER PUBLICATIONS

S. M. Cohen et al.; Transparent Ultraviolet14 Barrier Coatings; Journal of Polymer Science; Part A-1, vol. 9, 3263-3299; (1971).

D. L. Love; How Polyarylates Resist Weathering; Modern Plastics; Mar. 1984, pp. 60-62.

*Primary Examiner*—John Kight, III
*Assistant Examiner*—T. Mosley
*Attorney, Agent, or Firm*—Hedman, Gibson, Costigan & Hoare

[57] ABSTRACT

An aromatic polyphthalatecarbonate resin having a small percentage of phthalate units therein exhibits improved resistance to hazing and yellowing upon exposure to ultraviolet radiation. The polyphthalate carbonate resin is derived from the reaction products of a phthalate compound, a dihydric phenol and a carbonate precursor.

3 Claims, No Drawings

ULTRAVIOLET RADIATION RESISTANT POLYPHTHALATECARBONATE RESIN

This is a continuation of application Ser. No. 07/266,980 filed Nov. 4, 1988, now abandoned.

BACKGROUND OF THE INVENTION

1. Field of the Invention

The present invention relates to a polyphthalatecarbonate resin and, more particularly, relates to a polyphthalatecarbonate resin which exhibits a low degree of yellowness and exhibits a high level of resistance to yellowing and hazing caused by ultraviolet degradation.

2. Description of Related Art

Aromatic polycarbonate resins have found utility in glazing applications. For example, these resins have been made into sheets and films which have been used as windows and the like. Aromatic polycarbonate resins, however, suffer from degradation upon prolonged exposure to ultraviolet radiation resulting in the resins becoming increasingly yellowed and hazy over time. Prior attempts to reduce this yellowing and hazing have involved either coating the sheets and films with ultraviolet radiation absorbing compounds such as benzophenones or blending such compounds in with the polycarbonate resins. These techniques have, however, experienced various shortcomings, including the expensiveness of the absorbers, the equipment requirements associated with coating processes, and the use of solvents which must be evaporated off during coating of the sheet.

Polyarylate resins also have found some utility in glazing applications, however, polyarylates are well known to have severe yellowing problems when exposed to ultraviolet light due to a photo-Fries rearrangement occurring at the ester bond linkage to an aryl group (See, for example, U.S. Pat. No. 4,534,104 and Adv. Photochem., 8, 109-159 (1971)). This ultraviolet light promoted reaction results in a rearrangement of the type illustrated below:

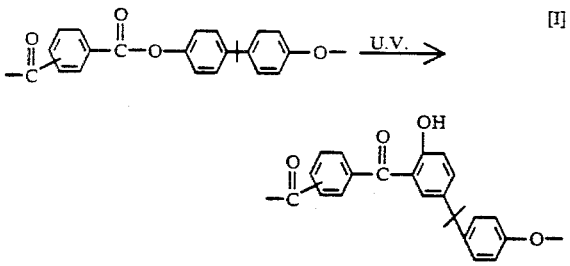

This type of degradation leaves a yellow colored layer within the exposed surface of the polyarylate resin as a product of the photo-Fries rearrangement. Additionally, polyarylate resins typically have relatively high initial levels of yellowness which make them less attractive than aromatic polycarbonate resins in glazing applications.

Accordingly, one object of the present invention is to provide a transparent thermoplastic resin which exhibits low levels of initial yellowness and high degrees of resistance to yellowing and hazing upon prolonged exposure of ultraviolet radiation thereto.

Another object of the present invention is to provide a transparent copolycarbonate resin which exhibits high degrees of resistance to yellowing and hazing from ultraviolet radiation without the need for the use of relatively expensive and, sometimes, toxic ultraviolet radiation absorbing additives.

SUMMARY OF THE INVENTION

The present invention provides an aromatic polyphthalatecarbonate resin which inherently exhibits relatively low levels of initial yellowness and exhibits relatively high degrees of resistance to ultraviolet radiation and consequent yellowing and hazing. The polyphthalatecarbonate resin is prepared by reacting relative amounts of a dihydric phenol with a carbonate precursor and a phthalate compound.

DETAILED DESCRIPTION OF THE INVENTION

The polyphthalatecarbonate of the present invention is derived from the reaction products of the following reactants: (a) dihydric phenol, (b) a carbonate precursor and (c) a phthalate compound. Preferably the dihydric phenol is present at a level of about 48-52 mole percent, most preferably 50 mole percent, based on the total moles of reactant. Preferably the carbonate precursor is present at a level of from about 42.5 to 47.5 mole percent based on the total moles of reactants, and most preferably at a level of 45 mole percent thereof; and preferably said phthalate compound is present at a level of from about 7.5 to 2.5 mole percent based on the total moles of reactants, and most preferably at a level of 5 mole percent thereof.

The dihydric phenols useful in preparing the polyphthalatecarbonate resins which are used in the practice of this invention are in general represented by the formula:

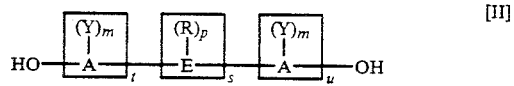

wherein A represents an aromatic group such as phenylene, biphenylene, naphthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, an ether linkage, a carbonyl linkage, a silicon-containing linkage, or by a sulfur-containing linkage such as sulfide, sulfoxide, sulfone, etc. In addition, E may be a cycloaliphatic group (e.g., cyclopentyl, cyclohexyl, etc.); a sulfur containing linkage, such as sulfide, sulfoxide or sulfone; an ether linkage; a carbonyl group; or a silicon-containing linkage such as silane or siloxy. R represents hydrogen or a monovalent hydrocarbon group such as alkyl(methyl, ethyl, propyl, etc.), aryl(phenyl, naphthyl, etc.), alkylaryl(benzyl, ethylphenyl, etc.), or cycloaliphatic(cyclopentyl, cyclohexyl, etc.). Y may be an inorganic atom such as halogen(fluorine, bromine, chlorine, iodine), a group such as R above, or an oxy group such as OR, it being only necessary that Y be inert to and unaffected by the reactants and reaction conditions. The letter m represents any integer from and including one through the number of positions on A available for substitution; p represents an integer from and including zero through the number of positions on E available for substitution; t represents an integer equal to at least one; s is either zero or one; and u represents any integer including zero.

In the dihydric phenol compound represented by Formula II above, when more than one Y substituent is present, they may be the same or different. The same holds true for the R substituent. Where s is zero in Formula II and u is not zero, the aromatic rings are directly joined with no intervening alkylene or other bridge. The positions of the hydroxyl groups and Y on the aromatic nuclear residues A can be varied in the ortho, meta, or para positions and the groupings can be in vicinal, asymmetrical or symmetrical relationship where two or more ring carbon atoms of the hydrocarbon residue are substituted with Y and hydroxyl groups.

Some nonlimiting examples of dihydric phenols falling with the scope of Formula II include:

2,2-bis(4-hydroxyphenyl)propane (bisphenol A);
2,4'-dihydroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
2,2-bis-(3,5-dimethyl-4-hydroxyphenyl)propane;
bis-(3,5-dimethyl-4-hydroxyphenyl)sulfone;
4,4-dihydroxybiphenyl;
1,1-bis(4-hydroxy-2-chlorophenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

These dihydric phenols may be used alone or as mixtures of two or more different dihydric phenols. The most preferred dihydric phenol is bisphenol A.

The carbonate precursor may be a carbonyl halide, a carbonate ester or a haloformate. The carbonyl halides which can be employed herein are carbonyl chloride, carbonyl bromide and mixtures thereof. Typical of carbonate esters which may be employed herein are diphenyl carbonates; di(halophenyl)carbonates such as di(chlorophenyl) carbonate, di(bromophenyl)carbonate, di(trichlorophenyl)carbonate, di(tribromophenyl)carbonate, etc.; di(alkylphenyl)carbonates such as di(tolyl) carbonate, etc., di(naphthyl)carbonate, di(chloronaphthyl)carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols(bishaloformates of ethylene glycol, neopentyl glycol, polyethylene glycol, etc.). Carbonyl chloride, also known as phosgene, is the preferred carbonate precursor if prepared by an interfacial process.

The phthalate compound generally includes the iso and terephthalic acid dihalides, for example the acid dichlorides and dibromides, particularly the acid dichlorides, are employed. Of the aromatic halides employed, the isophthaloyl dihalide and the terephthaloyl dihalide are preferred although alkyl and halo substituents on the aromatic ring can also be present. Mixtures of phthalate compounds can be employed and it is preferred that the mixtures be isophthalate rich. The molar ratio of terephthaloyl dihalide to isophthaloyl dihalide can vary.

Also present during the co-reaction between the dihydric phenol, the carbonate precursor and the phthalate compound are catalysts, monofunctional molecular weight regulators, and acid acceptors. Examples of suitable molecular weight regulators include phenol, p-tertiary butyl phenol, etc. Examples of suitable catalysts include tertiary amines, quaternary ammonium compounds, acid acceptors include tertiary amines, alkali or alkaline earth metal hydroxides, etc.

The polyphthalatecarbonates can be prepared by any of the usual well known procedures for the preparation of polyestercarbonates, for example melt polymerization or interfacial polymerization. Examples of procedures are in U.S. Pat. Nos. 3,169,121; 3,030,331; 4,194,038; 4,156,069; 4,238,596 and 4,238,597 all of which are incorporated by reference.

The solution and interfacial processes commonly employ the reaction of phosgene and acid dichlorides with bisphenol in a polymer solvent and in the presence of a hydrogen chloride acceptor. The polymer is produced as a solution and must be recovered by solvent removal. The melt process utilizes the reaction of bisphenol with a diaryl carbonate (commonly diphenyl carbonate) and a diaryl ester of the selected diacid co-reactant (commonly diphenyl isophthalate). The reaction is conducted in the melt stage at a temperature above the polymer melting range and under reduced pressure to remove the monofunctional phenolic by-product. The polymer is recovered from the reactor by forcing the melt through a stranding dye into a cooling bath followed by chopping to pellet size.

Any of the above processes may be employed to prepare the polyphthalatecarbonate of this application.

The dihydric phenol, carbonate precursor and phthalate compound will react to form a polyphthalatecarbonate resin comprising polymers having (a) dihydric phenol derived moieties present at a level of about 48-52 mole percent, more preferably 50 mole percent, based on the total moles of moieties present in the polymer; (b) carbonate moieties present at a level selected from between about 42.5 and 47.5 mole percent based on the total moles of moieties present in the polymer, and most preferably at a level of about 45 mole percent thereof; and (c) phthalate moieties present at a level selected from between about 7.5 and 2.5 mole percent based on the total mole of moieties present in said polymer, and more preferably at a level of about 5 mole percent thereof.

The carbonate moieties are of the general formula:

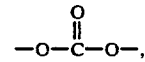     [III]

and the phthalate moieties are preferably selected from the group consisting of terephthalate moieties, isophthalate moieties and mixtures thereof. The terephthalate moieties are represented by the general formula:

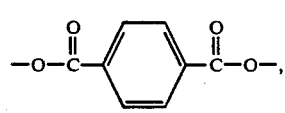     [IV]

and the isophthalate moieties are represented by the general formula:

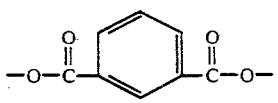

The dihydric phenol derived moieties of the polyphthalate carbonate polymer are represented by the general formula:

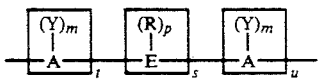

The preferred dihydric phenol derived moieties derived from bisphenol A are represented by the formula:

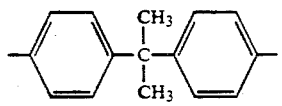

The preferred polymer can be further defined as consisting essentially of first units represented by the formula:

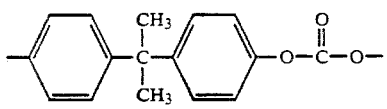

and second units selected from the group consisting of:

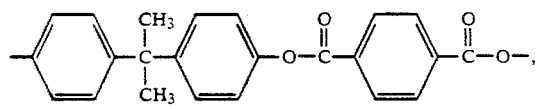

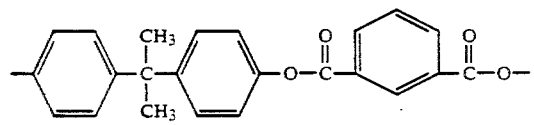

and mixtures thereof. The second units are preferably present at a level selected from between about 5 and 15 percent of the combined total number of said first and second units present in the polymer; and most preferably present at a level of about 10 percent thereof. The first and second units preferably representing at least 95 percent by weight of the polymer.

The polyphthalatecarbonate resin of the present invention can be made into the form of sheets having a thickness of from 30 mils to 1000 mils or film having a thickness of from 1 mil to 30 mils for glazing applications or the like. The polyphthalatecarbonate polymers of the present invention preferably have weight average molecular weight as obtained by GPC selected from between about 30,000 and about 80,000.

EXAMPLES

The following examples are presented by way of illustration and not by way of limitation.

The effect of ultraviolet radiation upon the polymeric resins was determined by employing a Q Panel Co. QUV in which samples were exposed in 12 hour cycles to 8 hours of UV radiation from QFS-40 UVA lamps at 70° C. followed by 4 hours of darkness at 50° C. and 100 percent humidity.

TABLE 1

Change in YI After 1000 Hrs of QUV Aging for Polyphthalatecarbonate Resin

| Polymeric Resin[b] | Delta YI[c] After 1000 Hrs |
|---|---|
| Control | 32 |
| 2.5% IP | 18 |
| 5% IP | 12 |
| 7.5% IP | 15 |
| 7.5% TP | 17 |

[a]Time is given in hours as total light time. The polymeric resins were in the form of films having thicknesses of between 1.5–2.0 mils.
[b]Control = Polycarbonate resin derived from bisphenol A and phosgene
IP = Polyphthalatecarbonate resin derived from bisphenol A, phosgene and isophthaloyl dichloride
TP = Polyphthalatecarbonate resin derived from bisphenol A, phosgene and terephthaloyl dichloride
2.5% IP is derived from reactants comprising 2.5 mole percent isophthaloyl dichloride, 47.5 mole percent phosgene and 50 mole percent bisphenol A based on the total moles of reactants reacted.
5% IP is derived from reactants comprising 5 mole percent isophthaloyl dichloride, 45 mole percent phosgene and 50 mole percent bisphenol A.
7.5% IP is derived from reactants comprising 7.5 mole percent isophthaloyl dichloride, 42.5 mole percent phosgene and 50 mole percent bisphenol A.
7.5% TP is derived from reactants comprising 7.5 mole percent terephthaloyl dichloride, 42.5 mole percent phosgene and 50 mole percent bisphenol A.
[c]Yellowness Index: Yellowness is defined as the deviation in chroma from whiteness in the dominant wavelength range from 570 to 580 m.

TABLE 2

Change in Haze on QUV Aging for Polyphthalatecarbonate Resins

| Polymeric Resin[b] | Change in Haze (%) With Hours of QUV Aging[a] | | | | | | | | |
|---|---|---|---|---|---|---|---|---|---|
| | 100 | 200 | 300 | 400 | 500 | 700 | 800 | 900 | 1000 |
| Control | 1 | 1 | 2 | 1 | 1 | 5 | 6 | 5 | 11 |
| 2.5% IP | 1 | 2 | 1 | 2 | 1 | 2 | 3 | 3 | 5 |
| 5% IP | 1 | 2 | 2 | 2 | 2 | 2 | 2 | 2 | 2 |
| 7.5% IP | 1 | 1 | 0 | 1 | 1 | 1 | 1 | 1 | 1 |
| 7.5% TP | −3 | −1 | −2 | −2 | −3 | 0 | −2 | −3 | −3 |

[a]Time is given in hours as total light time. The samples were exposed as follows: 8 h of light at 70° C. followed by 4 h of darkness at 50° C., at 100% relative humidity, and QFS-40 UVA lamps were used.
[b]Control = Polycarbonate resin derived from bisphenol A and phosgene
IP = Polyphthalatecarbonate resin derived from bisphenol A, phosgene and isophthaloyl dichloride
TP = Polyphthalatecarbonate resin derived from bisphenol A, phosgene and terephthaloyl dichloride
2.5% IP is derived from reactants comprising 2.5 mole percent isophthaloyl dichloride, 47.5 mole percent phosgene and 50 mole percent bisphenol A based on the total moles of reactants reacted.
5% IP is derived from reactants comprising 5 mole percent isophthaloyl dichloride, 45 mole percent phosgene and 50 mole percent bisphenol A.
7.5% IP is derived from reactants comprising 7.5 mole percent isophthaloyl dichloride, 42.5 mole percent phosgene and 50 mole percent bisphenol A.
7.5% TP is derived from reactants comprising 7.5 mole percent terephthaloyl dichloride, 42.5 mole percent phosgene and 50 mole percent bisphenol A.

As can be noted from the examples, the polyphthalatecarbonate resin derived from reactants comprising 5 mole % isophthaloyl dichloride based on the combined total moles of phthalate compound, carbonate precursor and dihydric phenol experienced the lowest increase in yellowing over an extended period of time of exposure to ultraviolet radiation while also experiencing a minimal increase in hazing over an extended exposure to ultraviolet radiation. The examples illustrate that the incorporation of a small percentage phthalate moieties in a polyphthalatecarbonate polymer can produce a resin having low degrees of yellowing and hazing upon extended exposure to ultraviolet radiation while employing a resin that has a relatively low initial and final level of yellowness. This polymer has improved properties over prior polyester carbonates.

What is claimed:

1. An aromatic polyphthalatecarbonate resin derived from:
   (a) dihydric phenol;
   (b) a carbonate precursor; and
   (c) a phthalate compound providing phthalate units, said phthalate compound being present at a level of 5 mole percent based on the combined total moles of carbonate precursor, phthalate compound and dihydric phenol.

2. An aromatic polyphthalatecarbonate resin comprising a polymer consisting essentially of the following moieties:
   (a) dihydric phenol derived moities present at a level of about 50 mole percent based on the total moles of moities present in said polymer, said dihydric phenol derived moities being represented by the formula:

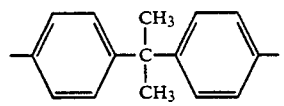

(b) carbonate moieties present at a level of about 45 mole percent based on the total moles of moieties present in said polymer, said carbonate moieties being represented by the formula:

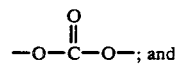

(c) phthalate moieties present at a level of 5 mole percent based on the total moles of moieties present in said polymer, said phthalate moieties being selected from the group consisting of terephthalate moieties represented by the formula:

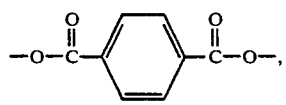

isophthalate moieties represented by the formula:

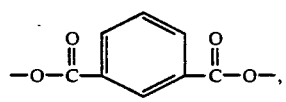

and mixtures thereof.

3. The polyphthalatecarbonate of claim 1 wherein said phthalate compound is isophthaloyldichloride.

* * * * *